(12) United States Patent
Müller et al.

(10) Patent No.: US 7,493,677 B2
(45) Date of Patent: Feb. 24, 2009

(54) HOLDING CLIP FOR FIXING THE POSITION OF GETTERS

(75) Inventors: Matthias Müller, Mitterteich (DE); Günter Bauer, Tirschenreuth (DE)

(73) Assignee: Schott AG, Mainz (DE)

( * ) Notice: Subject to any disclaimer, the term of this patent is extended or adjusted under 35 U.S.C. 154(b) by 535 days.

(21) Appl. No.: 10/601,325

(22) Filed: Jun. 20, 2003

(65) Prior Publication Data
US 2004/0064925 A1    Apr. 8, 2004

(30) Foreign Application Priority Data
Jun. 27, 2002    (DE)    ............................. 102 28 883

(51) Int. Cl.
*H01J 17/24*    (2006.01)
(52) U.S. Cl. ........................ 24/546; 313/553
(58) Field of Classification Search ................ 313/553, 313/556, 559, 481; 417/48, 51; 24/546
See application file for complete search history.

(56) References Cited

U.S. PATENT DOCUMENTS

| | | | | |
|---|---|---|---|---|
| 2,082,851 A * | 6/1937 | Smith | ........................ | 313/481 |
| 2,575,835 A * | 11/1951 | Pohle | ........................ | 313/559 |
| 3,634,717 A * | 1/1972 | La Garenne-Colombes | . | 313/556 |
| 3,737,710 A * | 6/1973 | Waymouth et al. | .......... | 313/553 |
| 4,374,344 A * | 2/1983 | Misono et al. | .............. | 313/482 |
| 5,023,512 A | 6/1991 | Schaaf | ........................ | 313/560 |
| 5,210,460 A * | 5/1993 | Utsumi et al. | ................ | 313/481 |
| 5,386,432 A * | 1/1995 | Ficalora et al. | .............. | 313/549 |
| 5,587,622 A | 12/1996 | Mohacsi | ...................... | 313/493 |
| 5,712,529 A * | 1/1998 | Ricaud et al. | ................ | 313/481 |
| 5,717,290 A * | 2/1998 | Shaffer | ........................ | 313/545 |
| 5,722,124 A * | 3/1998 | Wisniewski | ................... | 24/295 |
| 5,827,048 A | 10/1998 | Tonegawa et al. | .............. | 417/48 |
| 6,392,335 B1 * | 5/2002 | Arai | ........................... | 313/451 |

FOREIGN PATENT DOCUMENTS

| | | |
|---|---|---|
| DE | 32 17 868 | 12/1982 |
| DE | 32 17 869 | 12/1982 |
| DE | 27 21 449 | 8/1983 |
| JP | 01021854 | 1/1989 |

* cited by examiner

*Primary Examiner*—James R Brittain
(74) *Attorney, Agent, or Firm*—Ohlandt, Greeley, Ruggiero & Perle, L.L.P.

(57) ABSTRACT

A holding clip is provided for fixing the position of components which carry getters and are arranged at least partly as holl bodies in containers used in vacuum systems. The holding clip include, a partial section supporting the component carrying the getter and a partial section forming a supporting part for support in the container. The partial section supports the component carrying the getter by way of a flexurally rigid connection. The partial section is provided with a spring-elastic arrangement, so that the component carrying the getter can be braced relative to the partial section supporting the component carrying the getter and the supporting part can be braced relative to the inner surface of the container by elastic deformation.

12 Claims, 3 Drawing Sheets

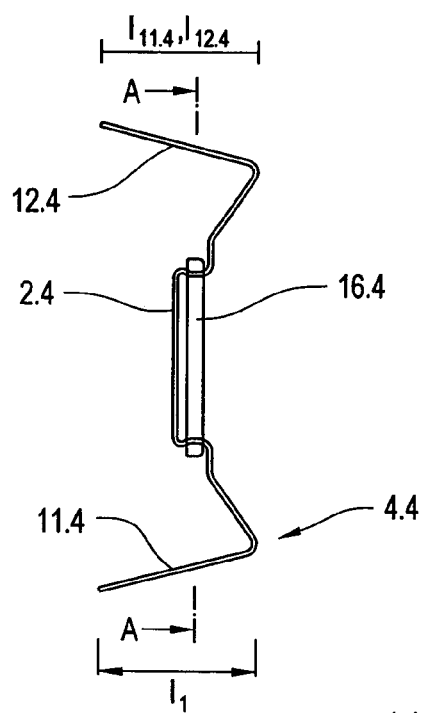
Fig.4a
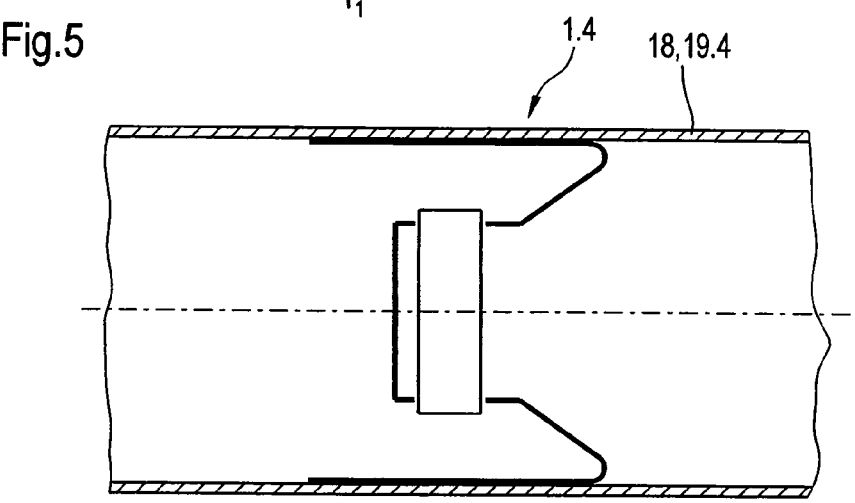
Fig.5
Fig.6a Fig.6b
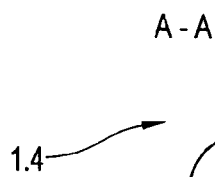
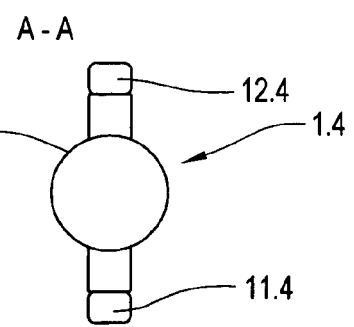

HOLDING CLIP FOR FIXING THE POSITION OF GETTERS

It is known to use getters for the entire service life of enclosed vacuum systems, e.g. electron tubes, lamps or even vacuum tube collectors, in order to maintain a minimum pressure which is usually below $10^{-3}$ mbar. These concern materials which are capable of binding considerable quantities of gas by absorption or by chemical conversion and are used for maintaining or improving the vacuum in enclosed systems. Known are evaporative getters, volume getters or layer getters. Barium is usually used for so-called evaporative getters as are used in electron tubes. The delivery of such evaporative getters occurs in so-called containers. These are metal rings which are open on one side, into which a barium-aluminum alloy is pressed. They are also known as getter rings. In enclosed systems these rings are then inductively ignited, so that the barium will deposit on the walls of the container, and especially a glass container, and will chemically bind the possibly released gases. For this purpose it is known to provide the getter rings with a welded wire bracket which is then fastened in the system, and especially in the glass container, in a suitable fashion. In addition to the welding of the wire on the ring it is also necessary to make precautions for a suitable fastening. This causes an increased production effort. The welded wire bracket further leads to a more difficult handling of the rings due to the likelihood of interlocking, especially during transport and storage.

Getter holding devices are known in a large variety of embodiments. Reference is hereby made in a subsidiary fashion to the printed publications a) DE 32 17 868 A1 b) DE 32 17 869 A1.

The printed publication DE 32 17 868 A1 describes a getter apparatus with a holding device and with supporting devices which rest against the wall of an electron tube, especially a television tube. A metal strip acts as a supporting device which is connected integrally or entirely with the getter apparatus and is bent in a U-shaped fashion. It tapers off at each end in a rounded supporting foot. The individual getter apparatus is characterized by a concrete geometric design to which the design of the holding device and the supporting devices is adjusted in order to ensure a connection with the getter apparatus. In the pre-mounted state there is increased difficulty in handling due to the geometry and there is a likelihood of interlocking, especially during transport and storage.

The invention is therefore based on the object of developing an apparatus for fastening and fixing the position of getters, especially getter rings, which in addition to a simple fixing of the position and fastening of the getter in the container, and especially glass containers, for forming a vacuum system is characterized by ease of mounting and handling. Moreover, the effort in construction and production for such a holding and fixing device is to be kept as low as possible.

In accordance with the invention, a holding clip is provided for fixing the position of components carrying getters in containers of any desired geometrical cross section for vacuum systems, which clip is provided with a partial section supporting the component carrying the getter and a partial section for support in the housing, which is also known as supporting part. The supporting part and the partial section supporting the component carrying the getter are mutually connected in a flexurally rigid fashion. Means are provided on the partial section supporting the component carrying the getter which allow a non-positive connection with the component carrying the getter. The non-positive connection is produced by bracing, especially clamping between the partial section supporting the component carrying the getter and the component carrying the getter. Furthermore, the supporting part can be clamped relative to the container.

In accordance with the invention, the supporting part and the partial section supporting the component carrying the getter are arranged for this purpose in a spring-elastic manner. This property can be set as a function of the contour, the cross section of the elements describing the contour of said partial sections, and the material. The connection between the supporting part and the partial section supporting the component carrying the getter is provided with a flexurally rigid arrangement.

In addition to the advantage of a simple and secure fixing of the position and fastening of the component carrying the getter on the holding clip and, via the clamping of the same, relative to the inner circumference of the container in a vacuum system, the solution in accordance with the invention offers the advantage of a simple fixing of the position of the component carrying the getter without needing to provide any special devices for fastening the holding apparatus. Moreover, as a result of the spring-elastic configuration it is possible to realize a simple assembly and disassembly of the holding clip from the container and/or the component carrying the getter from the holding clip. The flexurally rigid coupling of supporting part and the section supporting the component carrying the getter also produces a forced movement of the partial section supporting the getter in the case of an elastic deformation of the supporting part, so that the mounting of the component carrying the getter can occur simultaneously with the clamping of the holding clip in the container. Depending on the size of the holding clip and its configuration it can be used for any kind of container with different purposes in vacuum systems.

According to an especially advantageous embodiment the holding clip is formed by a wire or a flat spring steel sheet of a low cross section. The shaping of the supporting part and the partial section supporting the component carrying the getter occurs by means of a respective forming method, e.g. by bending. The holding clip is further preferably characterized by the arrangement in one plane of the supporting part and the partial section supporting the component carrying the getter. This offers the advantage of a simple production and furthermore a suitability for a large number of different purposes, especially in containers of different cross-sectional geometry because in this case there is always only a surface or line contact with the inner circumference of the container by 180° relative to each other.

The flexurally rigid connection between the supporting part and the partial section supporting the component carrying the getter occurs by providing two flexurally rigid corners, namely a first flexurally rigid corner between the supporting part and a connecting piece which is aligned at an angle to the same, preferably at 90°. The second flexurally rigid corner is formed between the connecting piece and the partial section supporting the component carrying the getter. The head part of the holding clip is formed by the partial section supporting the component carrying the getter. This end section is also provided with an enclosed configuration, whereas the second end section formed by the supporting part is open.

In the case of an arrangement made of a wire element or a spring steel sheet, the supporting part is formed by two leg elements which are arranged in a manner so as to be mutually offset by 180° and which are connected via a flexurally rigid connection, i.e. two flexurally rigid corners, with the partial section supporting the component carrying the getter, with said partial section also being formed by two leg elements which are mutually connected via a connecting piece. For the purpose of realizing the supporting function, the distance between the two leg elements of the supporting part is chosen in such a way that in the relieved state the same is equal to or larger than the interior dimension of the container which can be integrated in a vacuum system or delimits the same at two points which are arranged mutually offset by 180° on the interior circumference of the container.

The distance between the leg elements of the partial section supporting the component carrying the getter is equal to or larger than the dimensions between two points which are arranged mutually offset by 180° on the interior circumference of the component carrying the getter which for this purpose is configured at least partly as a hollow body. This solution offers the advantage that components of different geometry which carry getters can be fastened with the holding clip arranged in accordance with the invention, because there is merely a requirement concerning the distance between two places which are mutually offset by 180° according to an especially preferable embodiment and are thus situated at mutually opposite places on the interior circumference of the component carrying the getters. Preferably, the components carrying the getters are used which are in the form of rings. They are easy to produce and to handle.

When configuring the holding clip from a wire or spring steel sheet of low width and low cross section according to aforementioned especially preferable embodiment, the supporting part assumes two functions. On the one hand, it can be used in the case of elastic deformation for easing the mounting of the component carrying the getter on the partial section supporting the component carrying the getter and, on the other hand, it can additionally be used in the case of elastic deformation and relief of the clamping between holding clip and container. The positional fixing of the component carrying the getter thus occurs virtually indirectly through the supporting part in the container.

According to the embodiment of the holding clip, the same is characterized with respect to its axial extension by a) the sum total of the axial extension of the supporting part and the partial section supporting the component carrying the getter, or b) the axial extension of the supporting part.

In the first case, the partial section supporting the component carrying the getter is configured as a projection relative to the supporting part, whereas in the second case the partial section supporting the component carrying the getter is shaped into the supporting part. The second solution is characterized by a slight axial extension and is thus especially suitable for applications with a limited amount of construction space.

In order to create holding clips for a wide variety of interior distances, the supporting part, and especially the two leg elements, is provided with a design which rises towards the end section. In this way a surface or line pressing is achieved at least always over a partial section of the supporting part depending on the outside surfaces on the leg elements and/or the interior contour of the container. According to an especially advantageous embodiment, the leg elements are provided with an arrangement where they are each rounded off at least in the end zone of the supporting part and are additionally slightly inwardly sloped in the supporting part in order to avoid any scratching of the inner surface of the container.

For the purpose of improved adjustment to containers with a circular cross section, the leg parts of the supporting part are preferably shaped in a semi-circular fashion. This offers the advantage that a planar surface contact is produced in a far-reaching manner between the supporting part and the inner circumference of a tubular-shaped glass container, and not any linear surface contact which is usually characterized by higher loads.

The solution in accordance with the invention is suitable for fixing the position of components carrying getters in containers, and glass containers in particular, for the use in vacuum systems irrespective of the geometry of the container.

In a particularly advantageous manner, the holding clip for fixing the position of components carrying getters is used in the form of getter rings in collector tubes, and especially HV-ICR collector tubes.

BRIEF DESCRIPTION OF THE DRAWINGS

The solution in accordance with the invention will be explained below by reference to the enclosed drawings, wherein:

FIGS. 4a to 4c show three views of a second embodiment of a holding clip configured in accordance with the invention;

FIG. 5 shows a holding clip according to FIG. 4 in an installation situation in a container.

FIGS. 6a and 6b show possible cross-sectional configurations of the holding clip on the basis of a view along A-A.

DETAILED DESCRIPTION OF THE INVENTION

Figure 1:
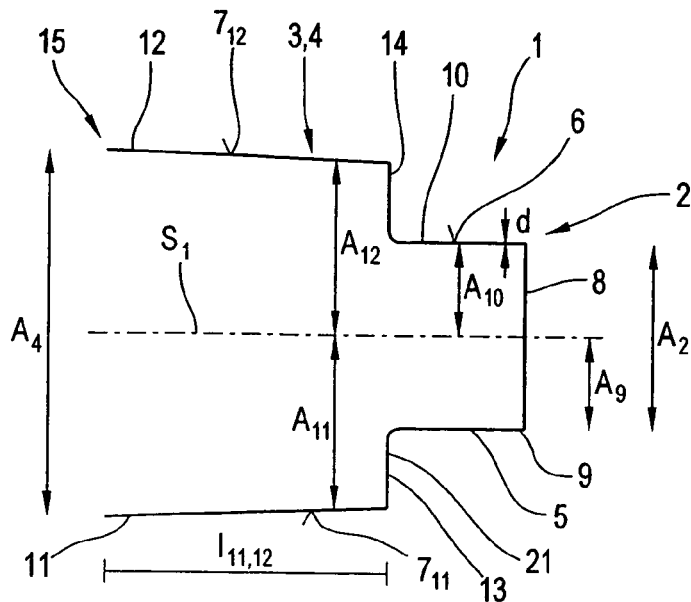
FIG. 1 shows a side view of a schematically simplified representation of a first embodiment of a holding clip in accordance with the invention for components carrying getters for fixing the position in containers, and glass containers in particular, for use in vacuum systems.

FIG. 1 shows in a schematically strongly simplified side view a holding clip 1 as configured in accordance with the invention for components carrying getters of different geometrical shapes. The components carrying the getters are arranged at least partly as hollow bodies for the purpose of fixing the position within containers of any desired geometrical cross section according to a first embodiment. The holding clip 1 comprises a first partial section 2 which supports the component carrying the getter and a second partial section which is used for support in the housing and which is also designated as supporting part 4. The partial section 2 supporting the component carrying the getter and the supporting part 4 are mutually connected by way of a flexurally rigid connection. Preferably, the connection is made directly, i.e. the partial section 2 supporting the component carrying the getter is adjacent to the supporting part 4 via the flexurally rigid connection 21. In accordance with the invention, further means 5 are provided for the non-positive connection of the component carrying the getter with the section 2 supporting the same, which in accordance with an especially advantageous embodiment is formed by the partial section 2 supporting the component carrying the getter itself, such that the same is provided with a spring-elastic arrangement and the geometry is chosen in such a way that the outside surface 6 is clamped on the partial section 2 supporting the component carrying the getter relative to the inner circumference of the getter. In this case the configuration of the partial section 2 supporting the component carrying the getter is made with respect to the function of the thickness d of the element forming the partial section 2 supporting the component carrying the getter, the geometry of the same and moreover the spring-elastic properties. The configuration is made in such a way that for the purpose of the clamping between the component carrying the getter and the supporting section which supports the same, the force that needs to be exerted by the partial section 2 relative to the inner circumference of the element carrying the getter is equal to or larger than the required theoretical holding force $F_H$ for the getter in its axial position relative to holding clip 1.

Supporting part 4 is configured with respect to its geometry and the properties of its material such that a clamping can be produced with respect to the container in which the holding clip 1 is introduced. It also applies in this case that the supporting part 4 is provided with a spring-elastic arrangement.

At least one partial surface can be clamped on the outside surface $7_{11}$, $7_{12}$ with the container, i.e. the same exercises a force on the inner circumference of the container which corresponds to the theoretically required holding force $F_H$ for the supporting part U relative to the inner circumference of the container.

Holding clip 1 is provided with an integral configuration according to FIG. 1 and characterized by a substantially plane geometry. This means that supporting part 4 and the partial section 2 supporting the component carrying the getter are arranged in one plane. The holding clip 1 is further preferably provided with a symmetrical arrangement. The partial section 2 supporting the component carrying the getter is characterized by lower outside dimensions $A_2$ than the supporting part 4. For the purpose of providing the planar arrangement of the partial section 2 supporting the component carrying the getter and the supporting part 4, the holding clip 1 is preferably arranged as a flat spring wire which was subjected to a respective shaping. The partial section 2 supporting the component carrying the getter comprises for this purpose two leg elements 9 and 10 which are mutually connected by way of a connection piece 8.

They each form the outside surfaces 6.10 and 6.9 which are preferably aligned in a mutually opposite manner. The supporting part 4 is also formed by two leg elements 11 and 12. They are each attached to the leg elements 9 and 10. Relating to the axis of symmetry $S_1$ of the holding clip 1, they each have a larger distance $A_{12}$ or $A_{11}$, respectively, than the distances of the leg elements 10 and 9 from the same. The distances of the leg elements 9 and 10 from the axis of symmetry $S_1$ are each designated with $A_9$ and $A_{10}$. The coupling between the leg elements 11 and 12 of the supporting part with the leg elements 9 and 10 of the partial section 2 supporting the getter occurs via the connection pieces 13 and 14 which are connected with the partial section 2 via one flexurally rigid corner with the supporting part 4 and a further flexurally rigid corner and thus realize a flexurally rigid connection 21 between the same. Preferably, the leg elements 11 and 12 are configured via their axial extension in the embodiment shown in FIG. 1 in an inclined manner relative to the axis of symmetry $S_1$ from the end section opposite of the partial section carrying the getter towards the partial section 2 carrying the getter. This arrangement ensures that at least over a part of the axial extension $I_{11,12}$ of the leg elements 11 and 12 they will rest on the container with their outside surfaces $7_{11}$, $7_{12}$ when they are installed in the container.

The production of the holding clip 1 occurs from a wire or a flat sheet metal strip with respective spring-elastic properties. The individual leg elements are shaped successively, e.g. in the sequence 12, 14, 10, 8, 9, 13, 11. The configuration from a flat sheet metal strip allows planar surface contact in the case of tensioning, and especially in the case of clamping the supporting part 4, whereas in the case of a wire-like arrangement it is generally only possible to provide a linear contact.

Figure 2:
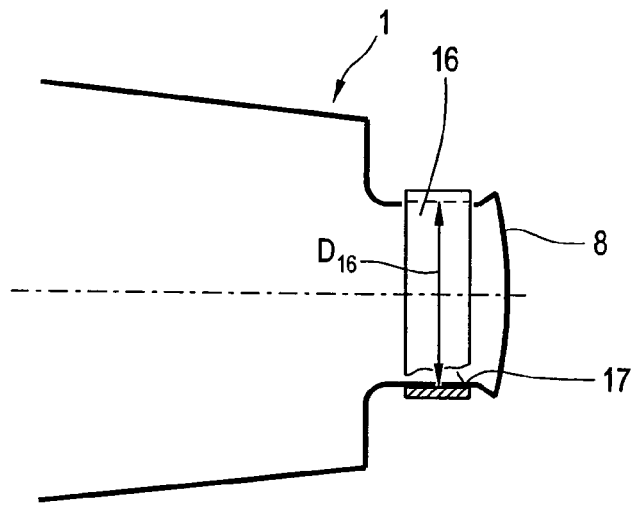
FIG. 2 shows a holding clip according to FIG. 1 with a component carrying a getter in the mounted state.

FIG. 2 shows for a holding clip according to FIG. 1 the state of a component 16 which is clamped with the same and supports the getter. The same reference numeral is used for the same elements. The component 16 carrying the getter is configured in this illustration as a getter ring. It is braced on its inner circumference 17 in this state with the outside circumference 6 of the partial section 2 supporting the component carrying the getter. FIG. 2 shows that the partial section 2 was deformed for achieving the non-positive connection with the getter 16. The outside dimensions $A_9$ or $A_{10}$ of the two leg elements 9 and 10 are equal to or larger than the inner diameter $D_{10}$ of the getter ring 16. An application of the getter ring 16 is merely possible by the action of force on the two leg elements 9 and 10, and thus by a deformation of the same and the connection piece 8. As a result of the spring-elastic properties of the partial section 2 supporting the component carrying the getter, it generates a force on the inner circumference 17 of the getter ring 16 which prevents an automatic displacement of the getter ring parallel to the axis of symmetry $S_1$ and merely allows a relative movement in the case of a larger force exerted from the outside. Said force which is exerted from the outside causes an elastic deformation, especially a pressing towards each other of the leg elements 9 and 10. Preferably, the section 2 supporting the component carrying the getter is configured with respect to its spring-elastic properties in such a way that even in the case of a vertical arrangement of the holding clip 1 there is no displacement of the getter ring 16 relative to the partial section 2 in the direction of gravity as a result of the weight of getter ring 16.

Figure 3:
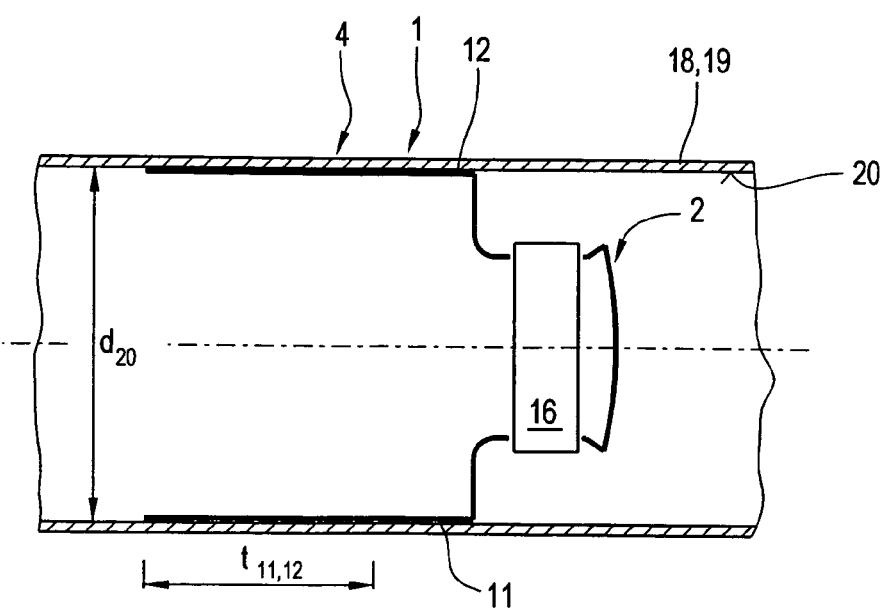
FIG. 3 shows a holding clip with a component carrying a getter in a state held in a container.

FIG. 3 illustrates the mounting situation of a holding clip 1 arranged according to FIG. 1 in accordance with the invention with a component 16 carrying the getter in the form of a getter ring 2 according to FIG. 2 in a container 18, with the container 18 being arranged in the form of a collector tube 19. This shows that the supporting part 4 is braced relative to the inner surface 20 of the collector tube 19. Merely a partial section of the leg elements 11 and 12 rests on the inside surface 20 of the collector tube 19. The size of the partial section which is designated here with $t_{11,12}$ is a function of the inner diameter $d_{20}$ of the collector tube 19, the dimension A 4 between the two leg elements 11 and 12 which are obtained from the partial distances $A_{11}$ and $A_{12}$, as well as the spring-elastic properties, especially the elastic limit of the material forming the leg elements 11 and 12. The fixing of the getter ring 16 usually remains unaffected by this function of the support.

The introduction of the getter ring 16 into the collector tube 19 occurs in a state when mounted on the holding clip 1, with the holding clip 1 being compressed, meaning that pressure is exerted on the two elements 11 and 12 in mutually facing manner. The reduction of the outside dimensions that this thus achieved, i.e. the distance between the outside circumferences $7_{12}$ and $7_{11}$ of the leg elements 11 and 12, allows introducing the holding clip 1 with ease into the container 18, and the tube in particular. When the force on leg elements 11 and 12 is reduced, the pretensioning of holding clip 1 is eliminated and the two leg elements rest in a mutually opposite direction on the inner circumference 20 of the collector tube 19.

The configuration of the holding clip 1 as described in FIGS. 1 to 3 represents an especially advantageous embodiment which can be formed from a simple wire element or a narrow spring steel sheet. This embodiment offers the advantage that the same is suitable for fixing in containers of different geometrical inside contours, meaning that the containers can be arranged as a tube or with other profile cross sections. Furthermore, the partial section 2 which supports the component carrying the getter and is represented here also allows securely fixing components of different geometrical shapes which carry getters with respect to their position. The relevant aspect is that for both bracings, the bracing of the supporting part 4 with respect to the inner circumference 20 and the bracing of the partial section supporting the component carrying the getter relative to the getter 16, at least a linear contact is produced between the elements to be mutually braced. Another possibility is configuring the holding clips in such a way that a planar surface contact is also possible. However, a holding clip which is configured in such a way is no longer as versatile as those described in FIGS. 1 to 3 because the configuration towards a planar surface contact is only suitable for certain applications in the case of a concrete dimensioning of the holding clip.

Figure 4B:
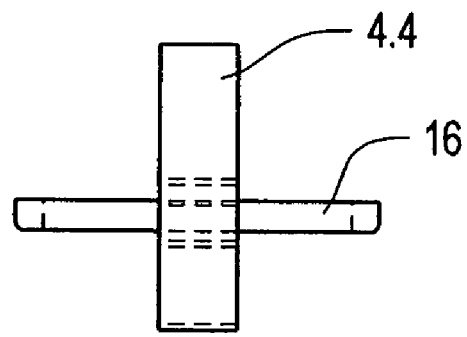
Figure 4C:
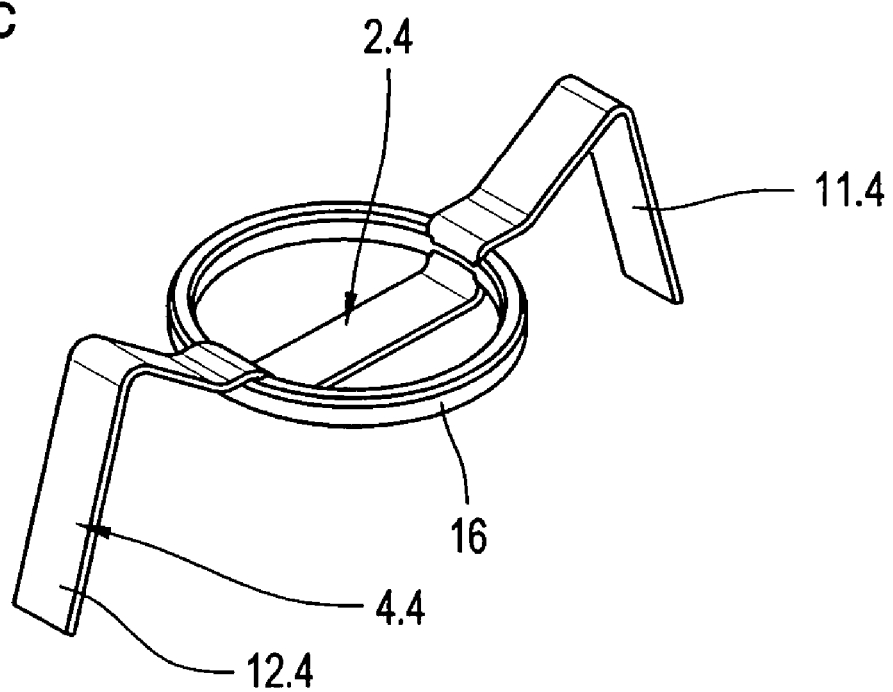

FIGS. 1 to 3 show an embodiment in which the supporting part and the partial section 2 supporting the component carrying the getter are switched behind one another in the axial direction and are disposed adjacent to one another. In contrast to this, FIGS. 4a to 4c show an alternative embodiment in which the axial extension of the holding clip $I_1$ is characterized by the axial extension of the supporting part 4.4 and thus the two leg elements 12.4 and 11.4, which are designated here with $I_{11.4,12.4}$. The component 16 carrying the getter is also configured in this case as a getter ring 16.4. The partial section 2.4 supporting the component 16 carrying the getter is arranged within the axial extension of the supporting part 4.4. The basic function concerning the non-positive connection between the getter 16.4 and the partial section 2.4 carrying the getter as well as the supporting part 4.4 and the container is arranged in an analogous manner to the arrangement as described in FIGS. 1 to 4.

FIG. 5 shows a holding clip 1.4 according to FIG. 4 in the mounted state in a container 18, especially a collector tube 19.4. The method for installation is configured in analogy to the arrangement as described in FIG. 3.

FIGS. 6a and 6b show the possibilities of configuring the leg elements in a strongly simplified cross-sectional view on the basis of a sectional representation along A-A according to FIG. 4. This shows that in the case of an embodiment according to FIG. 6a, the cross-sectional shape of the holding clip 1.4 is provided with a sharp-edged arrangement. Contrarily, the configuration of the supporting part 4 in FIG. 6b is made with leg elements 12.4 and 11.4 which are shaped in a semicircular fashion.

This solution is especially advantageous because in this way it is possible to provide a better adjustment to the curved inside contours of containers, and glass tubes in particular. Preferably, the leg elements 11 and 12 of the supporting part are additionally inwardly inclined in the open end region, thus preventing any scratching of the glass wall.

LIST OF REFERENCE NUMERALS

| \multicolumn{2}{c}{List of reference numerals} |
|---|---|
| 1, 1.4 | Holding clip |
| 2, 2.4 | Partial section supporting the component carrying the getter |
| 3 | Partial section which can be supported relative to the inside surface of a container |
| 4, 4.4 | Supporting part |
| 5 | Means for the non-positive connection of the getter with the partial section carrying the getter |
| 6, $6_9$, $6_{10}$ | Outside surface |
| $7_{11}$, $7_{12}$ | Outside surface |
| 8 | Connection piece |
| 9 | Leg element |
| 10 | Leg element |
| 11 | Leg element |
| 12 | Leg element |
| 13 | Connection piece |
| 14 | Connection piece |
| 15 | End section |
| 16 | Component carrying a getter |
| 17 | Inner circumference |
| 18 | Container |
| 19, 19.4 | Collector tube |
| 20 | Inner surface area |
| 21 | Flexurally rigid connection |
| $F_{H4}$, $F_{H16}$ | Holding force |
| $d_{20}$ | Inner diameter of the collector tube 19 |
| $S_1$ | Axis of symmetry of the holding clip |

The invention claimed is:

1. A holding clip for fixing the position of a getter in an inner surface of a container, comprising:
   a first section for supporting the getter;
   a second section for supporting said first section in the inner surface of the container; and
   a flexurally rigid connection connecting said first and second sections, wherein said flexurally rigid connection and said first and second sections are elastically deformable so that said flexurally rigid connection and said first and second sections bias said first section towards the inner surface to brace the getter in said first section and bias said second section towards the inner surface to brace said second section in said inner surface.

2. A holding clip as claimed in claim 1, wherein one of said first section, said second section, and said flexurally rigid connection have an elastic force set as a function of a property selected from the group consisting of a material property, a cross section, a shape of the holding clip, and any combinations thereof.

3. A holding clip as claimed in claim 1, wherein said first section comprises two first leg elements, said two first leg elements being mutually coupled via a connecting element, and wherein said second section comprises two second leg elements, each of said two first leg elements being connected to a respective one of said two second leg elements by a flexurally rigid corner.

4. A holding clip as claimed in claim wherein said two first leg elements are spaced from one another by a first distance and said two second leg elements are spaced from one another by a second distance, said first distance being smaller than said second distance.

5. A holding clip as claimed in claim 3, wherein said two second leg elements extend in an inclined manner from said flexurally rigid connection.

6. A holding clip as claimed in claim 3, wherein said first and second sections are arranged in a plane.

7. A holding clip as claimed in claim 3, wherein said two second leg elements have an edge that has a feature selected from the group consisting of a rounded off feature, a beveled feature, and any combinations thereof.

8. A holding clip as claimed in claim 3, wherein said first section is arranged at least partly between said two second leg elements.

9. A holding clip as claimed in claim 1, wherein the second section has an axial extension that defines an overall axis extension of the holding clip.

10. A holding clip as claimed in claim 1, wherein the holding clip has an overall axial extension equal to a total of a first axial extension of said first section and at least a second axial extension of said second section.

11. A holding clip as claimed in claim 1, wherein the holding clip is formed from a wire.

12. A holding clip as claimed in claim 1, wherein the holding clip is formed a spring steel of low width and small cross section.

* * * * *